United States Patent
Tomomatsu et al.

(10) Patent No.: US 10,260,464 B2
(45) Date of Patent: Apr. 16, 2019

(54) FUEL PIPING FOR VEHICLE, AND CLAMP THEREFOR

(71) Applicants: HONDA MOTOR CO., LTD., Minato-Ku, Tokyo (JP); SANOH INDUSTRIAL CO., LTD., Shibuya-Ku, Tokyo (JP)

(72) Inventors: Daisuke Tomomatsu, Wako (JP); Tatsuya Hoshino, Wako (JP); Hiroyuki Okada, Koga (JP); Satoshi Daimon, Koga (JP); Satoshi Matsubara, Koga (JP)

(73) Assignees: Honda Motor Co., Ltd., Tokyo (JP); Sanoh Industrial Co., Ltd., Tokyo (JP)

( * ) Notice: Subject to any disclaimer, the term of this patent is extended or adjusted under 35 U.S.C. 154(b) by 115 days.

(21) Appl. No.: 15/504,609

(22) PCT Filed: Aug. 17, 2015

(86) PCT No.: PCT/JP2015/073035
§ 371 (c)(1),
(2) Date: Feb. 16, 2017

(87) PCT Pub. No.: WO2016/027773
PCT Pub. Date: Feb. 25, 2016

(65) Prior Publication Data
US 2018/0017027 A1 Jan. 18, 2018

(30) Foreign Application Priority Data
Aug. 18, 2014 (JP) .................. 2014-166030

(51) Int. Cl.
*F02M 37/00* (2006.01)
*F16L 3/13* (2006.01)
*F16L 11/12* (2006.01)

(52) U.S. Cl.
CPC ........ *F02M 37/0017* (2013.01); *F02M 37/00* (2013.01); *F02M 37/0047* (2013.01); *F16L 3/13* (2013.01); *F16L 11/121* (2013.01)

(58) Field of Classification Search
CPC ........... F16L 11/12; F16L 11/121; F16L 9/006
(Continued)

(56) References Cited

U.S. PATENT DOCUMENTS 2,778,609 A * 1/1957 Peeps ...................... B05B 9/002
                                                       165/164
3,508,587 A * 4/1970 Mauch ................. F16L 11/121
                                                       138/119

(Continued)

FOREIGN PATENT DOCUMENTS

CN  1789068 A  6/2006
CN  1789773 A  6/2006
(Continued)

OTHER PUBLICATIONS

Office Action issued from the Japan Patent Office dated Jul. 3, 2018 in the corresponding JP patent application 2018-006897 with the English translation thereof.
(Continued)

*Primary Examiner* — Patrick F Brinson
(74) *Attorney, Agent, or Firm* — Carrier Blackman & Associates, P.C.; Joseph P. Carrier; Anne G. Sabourin

(57) ABSTRACT

Fuel piping for a vehicle, which is fixed by clamps and routed on a vehicle body, is formed to have a circular hollow section inside and anisotropy in a wall thickness thereof in the circumferential direction. In particular, the fuel piping for a vehicle has at least one thick-wall portion in the circumferential direction and is disposed on a vehicle body so that the thick-wall portion is positioned vertically at the top or bottom, or has one thick-wall portion in the circum-
(Continued)

ferential direction and is disposed on the vehicle body so that the thick-wall portion is positioned vertically at the top. In addition, the clamp for fixing to the vehicle the fuel piping for a vehicle includes a holding portion for arranging the thick-wall portion vertically at an end, and holding the fuel piping for a vehicle so as not to be turned in the circumferential direction thereof.

15 Claims, 5 Drawing Sheets

(58) Field of Classification Search
USPC ...... 138/123–126, 106, 107; 174/72 A, 68.3; 180/69.4, 65.1, 65.21
See application file for complete search history.

(56) References Cited

U.S. PATENT DOCUMENTS

| | | | | |
|---|---|---|---|---|
| 4,131,399 | A * | 12/1978 | Calvet | F04B 43/0072 417/477.12 |
| 4,275,761 | A * | 6/1981 | Waldhauser | A01G 25/095 137/595 |
| 4,437,679 | A * | 3/1984 | Campagnolo | B62K 19/02 138/141 |
| 4,463,779 | A * | 8/1984 | Wink | F16L 11/121 138/103 |
| 4,698,890 | A * | 10/1987 | Neaves | B29D 23/006 156/143 |
| 4,966,741 | A * | 10/1990 | Rush | B29C 53/083 138/103 |
| 5,215,450 | A * | 6/1993 | Tamari | A61M 1/0031 138/119 |
| 5,461,200 | A * | 10/1995 | Norcia | F16L 11/121 174/135 |
| 5,561,453 | A * | 10/1996 | Shibata | F16L 11/121 138/118 |
| 2003/0192611 | A1 * | 10/2003 | Weck | F16L 11/12 138/118 |
| 2006/0131884 | A1 | 6/2006 | Inoue et al. | |
| 2011/0031052 | A1 | 2/2011 | Inoue et al. | |
| 2015/0222102 | A1 | 8/2015 | Sugimoto | |

FOREIGN PATENT DOCUMENTS

| | | |
|---|---|---|
| CN | 101046264 A | 10/2007 |
| GB | 1134041 A | 11/1968 |
| JP | S54-111211 U | 8/1979 |
| JP | S54-33132 Y2 | 10/1979 |
| JP | H06-20976 U | 3/1994 |
| JP | H11-153260 A | 6/1999 |
| JP | 2002-362389 A | 12/2002 |
| JP | 2004-346975 A | 12/2004 |
| JP | 2006-170384 A | 6/2006 |
| JP | 2008-196637 A | 8/2008 |
| JP | 2009-041763 A | 2/2009 |
| WO | 2014/061414 A1 | 4/2014 |

OTHER PUBLICATIONS

Office Action issued from the Japan Patent Office dated Jul. 3, 2018 in the corresponding JP patent application 2014-166030 with the English translation thereof.
Chinese Office Action issued in the corresponding CN Patent Application 201580044295.5 dated Apr. 2, 2018.

* cited by examiner

PRIOR ART

FUEL PIPING FOR VEHICLE, AND CLAMP THEREFOR

CROSS-REFERENCE TO RELATED APPLICATION

This application is a U.S. National Stage Application under 35 U.S.C. § 371 of International Patent Application No. PCT/JP2015/073035 filed 17 Aug. 2015, which claims the benefit of priority to Japanese Patent Application No. 2014-166030 filed 18 Aug. 2014, the disclosures of all of which are hereby incorporated by reference in their entireties.

TECHNICAL FIELD

The present invention relates to fuel piping that is arranged between an engine and a fuel tank to feed fuel, and a clamp therefor.

BACKGROUND ART

In a small vehicle, fuel is fed through a resin pipe from a fuel tank disposed at a rear portion of a vehicle to an engine disposed at a front portion of the vehicle. In particular, a resin pipe having a small diameter has higher flexibility than that having a large diameter, and then may be molded into a straight tube, instead of being molded into a curved tube in the first place, so as to be flexibly deformed in a curved shape for mounting and fixing to the vehicle by fixing clamps at the time of assembly.

As such a small-diameter resin pipe formed in a straight tube as described above may have a risk of being scratched at portions clamped by the fixing clamps at the time of assembly, the Japanese Patent Application Publication No. 2006-170384 discloses a resin pipe including: a main resin pipe having an outer diameter of 6 mm or less; and an elastic layer having a predetermined wall thickness that is formed on the outer circumferential surface of the main resin pipe to have a laminate structure so as to cover the main resin pipe, and clamped by the fixing clamps over the entire length of an effective tube, which is flexibly deformable.

SUMMARY OF THE INVENTION

Problems to be Solved

The resin pipe disclosed in the Japanese Patent Application Publication No. 2006-170384 above, has high flexibility in itself to make mounting the pipe difficult without sagging. In addition, there is a problem that, when the resin pipe is deformed for mounting, the resin pipe is turned in the circumferential direction thereof after the resin pipe is clamped by the fixing clamps, because the pipe has a cylindrical shape in cross-section, to be wrongly positioned. In some cases, the resin pipe may sag more than necessary between the fixing clamps.

Further, there is another problem that the resin pipe may have gravitational sag between the clamps due to the weights of the resin pipe itself and the fuel.

Once the resin pipe sags, the resin pipe is excited due to the unevenness of a road surface during traveling and/or by the engine, or excited by the discharge pressure of a fuel pump, potentially to have excessive stress applied due to the excitation. In some cases, the resin pipe may have cracks because of the excitation, to suffer from leakage of liquid fuel.

For these problems, the number of clamps may be increased to prevent the resin pipe from sagging, but this solution increases the amount of work for mounting and fixing the resin pipe, leading to an increased parts cost as well as an increased assembly cost.

The present invention is intended to provide fuel piping for a vehicle that will be free from critical sagging and reduced work efficiency, and a clamp therefor.

Solution to Resolve Problems

In order to solve the problems as described above, fuel piping for a vehicle, which is fixed by clamps and routed on a vehicle body, is formed to have a circular hollow section inside and anisotropy in a wall-thickness in the circumferential direction.

In particular, the fuel piping for a vehicle has at least one thick-wall portion in the circumferential direction and is disposed on the vehicle body so that the thick-wall portion is positioned vertically at the top or bottom, or the fuel piping for a vehicle has one thick-wall portion in the circumferential direction and is disposed on the vehicle body so that the thick-wall portion is positioned vertically at the top.

In addition, a clamp for fixing to the vehicle the fuel piping for a vehicle according to the present invention includes a holding portion that arranges the thick-wall portion of the fuel piping for a vehicle vertically at an end, and holds the fuel piping so as not to be turned in the circumferential direction thereof.

Advantageous Effects of the Invention

According to the present invention, the amount of sagging can be reduced at the time of routing the fuel piping to suppress vibration of the fuel piping for preventing fuel leakage due to cracking of the fuel piping or the like, thereby improving safety.

EMBODIMENTS OF THE INVENTION

Hereinafter, embodiments of the present invention will be described in detail with reference to the accompanying drawings.

Figure 1:
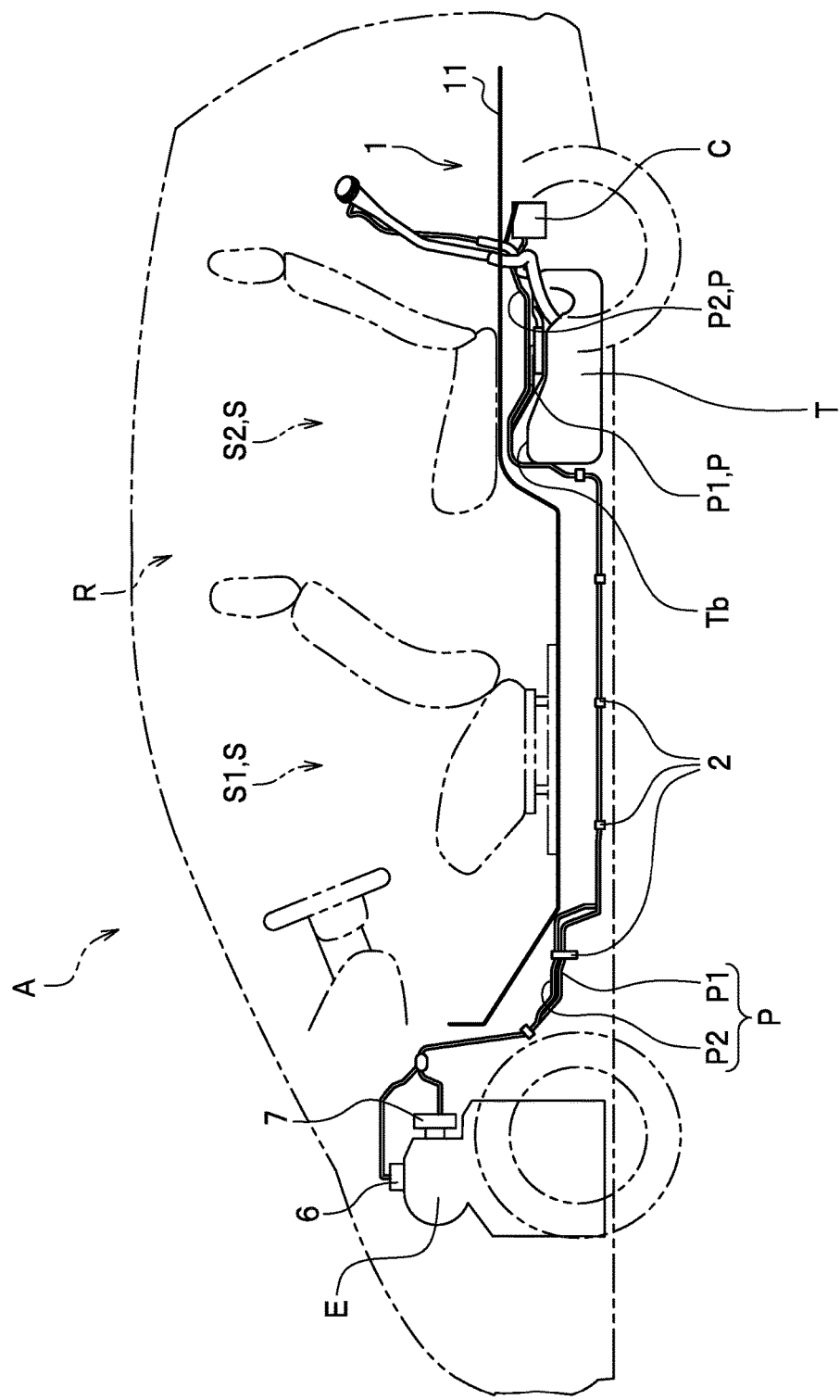
FIG. 1 is a side view schematically showing a vehicle including fuel piping according to the present embodiment.
Figure 2:
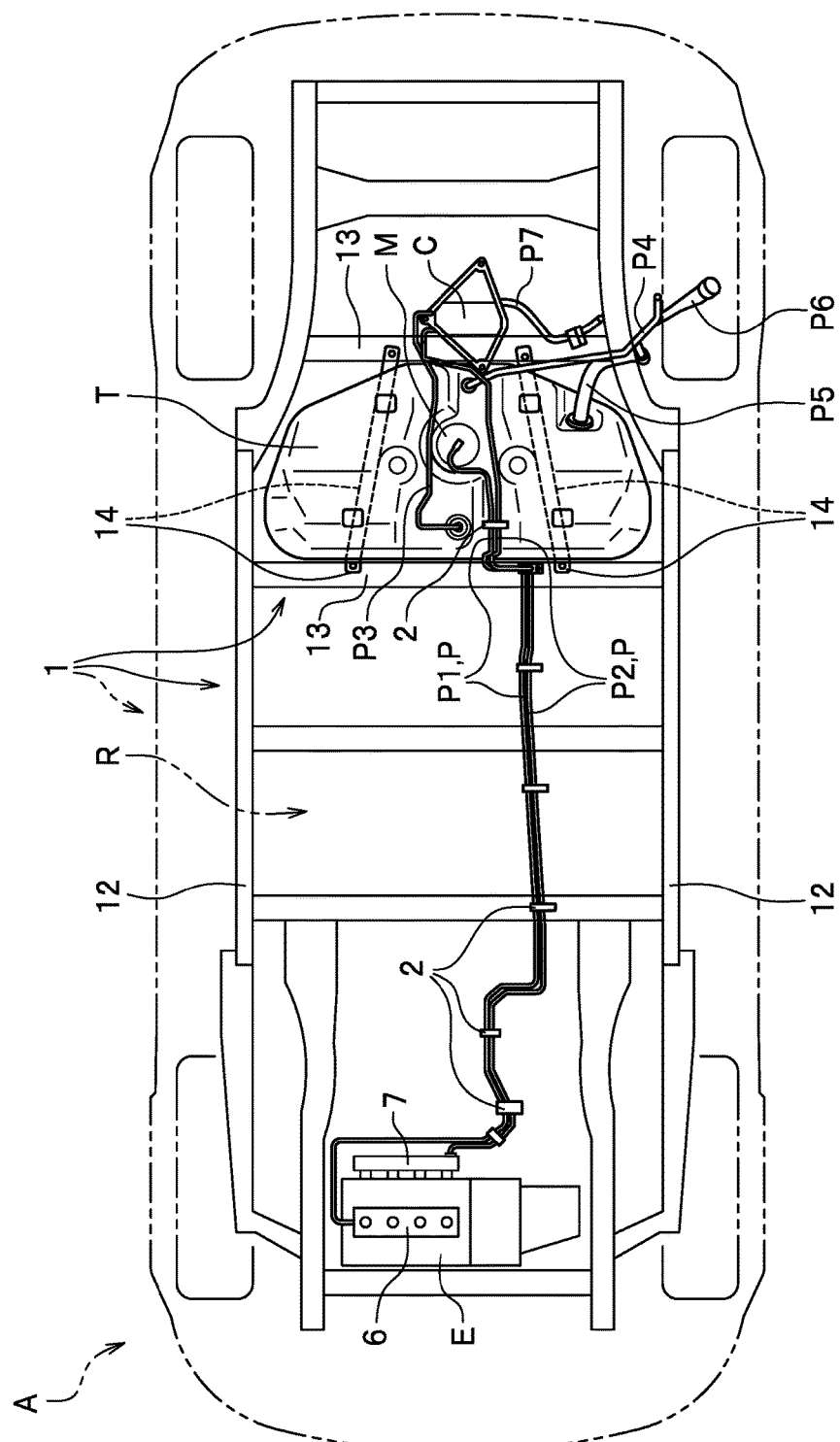
FIG. 2 is a plan view schematically showing the vehicle including the fuel piping according to the present embodiment.

FIG. 1 is a side view schematically showing a vehicle including fuel piping according to the present embodiment, and FIG. 2 is a plan view thereof.

As shown in FIG. 1, a vehicle A is a passenger vehicle including: seats S that are arranged in two rows, front and rear, or more in a passenger room R; an engine E that is arranged in front of the passenger room R; a fuel tank T that is arranged under the floor of a rear seat S2 of the seats S; a canister C that is disposed behind the fuel tank T; liquid fuel piping P1 for feeding liquid fuel from the fuel tank T to the engine E; vapor fuel piping P2 for feeding vapor fuel from the canister C to the engine E; and clamps 2 for fixing the liquid fuel piping P1 and the vapor fuel piping P2 to a vehicle body 1.

As shown in FIG. 2, the vehicle body 1 is a securing member of the vehicle A to which the engine E, the fuel tank T, the canister C, and the like are fixed, and composed of frame members and panel members such as a floor panel 11 (see FIG. 1), side frames 12, and cross members 13.

The floor panel 11 shown in FIG. 1 is a member to form the floor of the vehicle A, and composed of a metallic flat plate member such as a steel plate.

The side frames 12 shown in FIG. 2 are right and left frame members that are paired with each other and extend in a front-rear direction of the vehicle body 1, and are disposed on right and left outer sides of the fuel tank T.

The cross members 13 are a plurality of frame members that are bridged so as to be perpendicular to the right and left side frames 12, and disposed at least in front of and behind the fuel tank T, so that a plurality of tank bands 14 are bolted to the cross members 13 to hold the fuel tank T.

The tank band 14 is a band-shaped member made of metal for fixing the fuel tank T to the vehicle body 1, and fixed to the cross members 13, 13 by bolts and nuts so as to embrace the fuel tank T from the underside thereof.

The engine E can be any of those that are supplied with fuel from the fuel tank T for driving, such as a gasoline engine, a diesel engine, an ethanol engine, and a hybrid engine. An injector 6 and an intake manifold 7 are disposed on the engine E.

As shown in FIG. 1, the fuel tank T is a hollow container made of synthetic resin or metal for storing automotive liquid fuel such as gasoline, light oil, and alcohol, and is disposed on the lower surface of the floor panel 11 under the rear seat S2.

A pump module M is arranged on an upper surface Tb of the fuel tank T.

In addition, the liquid fuel piping (fuel piping) P1, a vent pipe P3, and a vapor return tube P4 are arranged on an upper portion of the fuel tank T. The liquid fuel piping P1 and the vapor fuel piping P2 are disposed on the upper surface Tb of the fuel tank T to run through near the center in a vehicle-width direction of the fuel tank T, and the clamp 2 is arranged to hold the liquid fuel piping P1 and the vapor fuel piping P2 in a state of bundling the piping together. Connected to a rear end portion of the fuel tank T is a filler pipe P6 having a front end connected to a fill opening via a filler neck tube P5. The canister C is disposed near the rear of the fuel tank T.

The pump module M includes: a suction filter for removing foreign substances in fuel; a fuel pump for feeding fuel from the liquid fuel piping P1 to the injector 6 and the engine E; a fuel level meter that detects the fuel level within the fuel tank T; a vent relief valve; and a cut valve, which are not shown. The pump module M houses these pieces of equipment in a unit case and is installed on the top of the fuel tank T.

As shown in FIG. 2, the liquid fuel piping P1 is piping for feeding liquid fuel, and composed of fuel piping one end of which is connected to the pump module M and the other end of which is connected via the injector 6 to the engine E. The liquid fuel piping P1 extends toward the front of the vehicle from the pump module M arranged on the upper surface of the fuel tank T at the center.

The vapor fuel piping P2 and the vent pipe P3 are pipes for feeding vapor fuel which is vaporized liquid fuel.

The vapor fuel piping P2 is composed of a purge pipe one end of which is connected to the canister C and the other end of which is connected via a purge adjustment solenoid valve (not shown) and the intake manifold 7 to the engine E. The vapor fuel piping P2 is bundled by clamps 2 and held to the upper surface Tb of the fuel tank T and the vehicle body 1.

The vent pipe P3 is composed of a pipe one end of which is connected to an oil float (not shown) and the other end of which is connected to the canister C.

The vapor return tube P4 is a reflux pipe for discharging part of the air in the upper space within the fuel tank T around the fill opening of the filler pipe P6, during fueling, so as to return the part of the air to the fuel tank T. One end of the vapor return tube P4 is connected to the fuel tank T, and the other end thereof is connected to the filler pipe P6 around the fill opening.

The filler pipe P6 and the filler neck tube P5 are pipes for supplying liquid fuel from the fill opening to the fuel tank T.

A drain pipe P7 is a pipe which is arranged to connect to the canister C, to discharge air, in which fuel vapor has been adsorbed and removed by the canister C, into the atmosphere and to take in air from the atmosphere.

As described above, pipes such as the liquid fuel piping P1 are arranged between the fuel tank T and its surroundings and the engine E. Hereinbelow, a description will be given in detail particularly of the structure of the liquid fuel piping P1 and the clamps 2 for fixing the liquid fuel piping P1.

Figure 3:
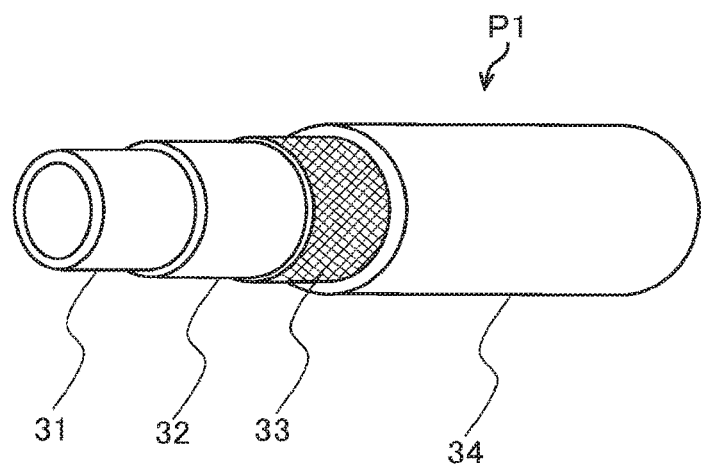
FIG. 3 is a diagram showing a cross-sectional structure of liquid fuel piping P1.

FIG. 3 is a diagram showing a cross-sectional structure of the liquid fuel piping P1 according to the embodiments.

The liquid fuel piping P1 has a multilayer structure composed of two or more resin layers made of thermoplastic resin material so as to be a hollow multilayer resin piping for internally flowing liquid fuel.

Specifically, the liquid fuel piping P1 is required to have low permeability for liquid fuel, and then a first layer 31 forming a hollow cylinder, in which liquid fuel flows through, is formed of FPM (fluoro-) rubber or ethylene tetrafluoroethylene copolymer (hereinafter, ETFE for short) series of resin. The FPM (fluoro-) rubber typically includes vinylidene fluoride (FKM) series, tetrafluoroethylene-propylene (FEPM) series, and tetrafluoroethylene-perfluoro vinyl ether (FFKM) series, where vinylidene fluoride series are major ones. Alternatively, other than the FPM (fluoro-) rubber and the ETFE resin, an ethylene-vinyl alcohol copolymer (hereinafter, EVOH for short), polyvinylidene fluoride (hereinafter, PVF for short), tetrafluoroethylene-hexafluoropropylene-vinylidene fluoride ternary copolymer (hereinafter, THV for short), or the like is used.

In addition, in a case where the first layer 31 is made of FPM (fluoro-) rubber, a second layer 32 and a third layer 34 which are made of ECO (epichlorohydrin) rubber are formed on the outer side of the first layer 31, in order to protect the first layer 31. Alternatively, in a case where the first layer 31 is made of ETFE resin, the second layer 32 and the third layer 34 are formed of PA 12 (nylon 12).

Further, in some cases reinforcing threads 33 (polyester fibers or aramid fibers) are woven between the second layer 32 and the third layer 34. This allows the liquid fuel piping P1 to be also used for a case where fuel liquid is highly pressured, such as in an injection vehicle.

The liquid fuel piping P1 in the embodiments is produced by an extrusion molding machine in a state that layers are attached to each other. A molding die may be changed at this time to mold the liquid fuel piping P1 having a shape other than a circle, which will be described later in detail.

Figure 4:
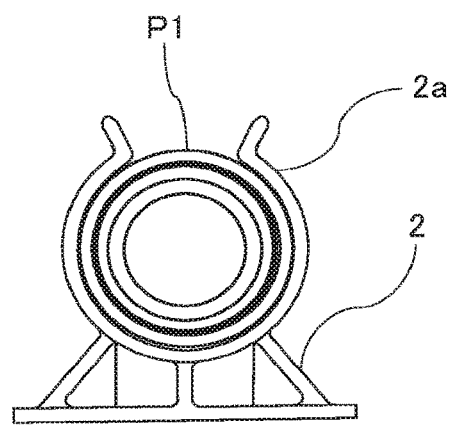
FIG. 4 is a diagram showing a conventional example of fixing the liquid fuel piping P1.

FIG. 4 is a diagram showing a conventional example in which the liquid fuel piping P1 is fixed by the clamp 2. The clamp 2 is made of elastic resin to pinch with a holding portion 2a the liquid fuel piping P1 over a predetermined width in the length direction (the direction perpendicular to the paper surface of FIG. 4) for fixing the liquid fuel piping P1. The holding portion 2a is substantially C-shaped so as to be elastically expanded when the liquid fuel piping P1 is pushed therein from a direction perpendicular to the opening of the C-shape for holding and fixing the liquid fuel piping P1, and the clamp remains partially open when in position to hold the piping.

The liquid fuel piping P1 is fixed by the clamps 2 as described above with frictional force between the liquid fuel piping P1 and the holding portion 2a. Then, if a predetermined level of force is applied in the circumferential direction of the liquid fuel piping P1, the liquid fuel piping P1 will be turned in the circumferential direction. At the time of mounting the liquid fuel piping P1 sequentially into the clamps 2, if the liquid fuel piping P1 is turned, the liquid fuel piping P1 may sag between the clamps 2. Sagging of the liquid fuel piping P1 between the clamps 2 at multiple locations may cause fuel leakage from the liquid fuel piping P1, as described above.

In addition, the weight of the liquid fuel piping P1 and the weight of the liquid fuel flowing through the tube causes the liquid fuel piping P1 to sag convexly in the direction of gravity. This impact becomes larger as the distance between the clamps 2 increases.

The sagging amount of the liquid fuel piping P1 described above may be reduced by increasing the number of clamps 2. This increases the frictional force between the liquid fuel piping P1 and the clamps 2 to suppress turning of the liquid fuel piping P1 and then to prevent sagging at the time of mounting the liquid fuel piping P1. In addition, the distance (span) between the clamps 2 is decreased to allow the liquid fuel piping P1 itself to have less amount of sagging due to its own weight and the weight of gasoline.

However, increasing the number of clamps 2 generates a problem that the number of steps of mounting the liquid fuel piping P1 is increased.

Further, the liquid fuel piping P1 may have a problem that the strength thereof is reduced due to swelling from the liquid fuel. The FPM (fluoro-) rubber and the ETFE series of resin, which have been described above, have low permeability for liquid fuel. Then, the innermost layer of the liquid fuel piping P1 is formed with one of these materials to serve as a barrier layer. However, the liquid fuel piping P1 cannot prevent swelling completely, and has some swelling caused by liquid fuel flowing through, resulting in reduced strength to have increased amount of sagging.

In the above description, the liquid fuel piping P1 is assumed to have a three-layer structure, but is not limited thereto and may have a two-layer structure, or may have a single-layer structure as long as the layer is made of resin having a barrier property against fuel.

For example, if a two-layer structure is adopted, a structure can be applied in which the inner layer is made of PA9T (nylon 9T) and the outer layer is made of HDPE (high density polyethylene). Alternatively, the inner layer may be made of PPS (polyphenylene sulfide) and the outer layer may be made of PA 11 (nylon 11). Still alternatively, a single-layer structure of PA 11 (nylon 11) or PA 12 (nylon 12) may be applied.

In the present embodiment, the liquid fuel piping P1 has anisotropy in a shape of cross section in the circumferential direction, and is mounted with respect to the anisotropy in terms of orientation to compensate for reduction of the strength due to swelling and accordingly to suppress the liquid fuel piping P1 from sagging. Hereinbelow, a description will be given in detail with examples of cross-sectional shapes of the liquid fuel piping P1.

First Embodiment

Figure 5:
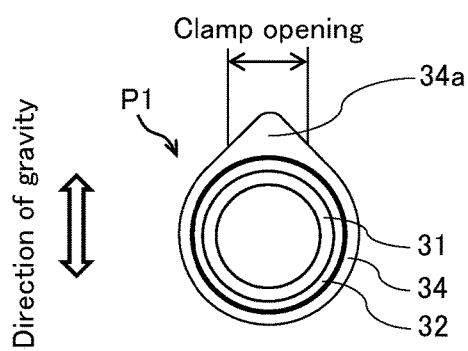
FIG. 5 is a diagram showing a cross-sectional structure of liquid fuel piping P1 of a first embodiment.
Figure 6:
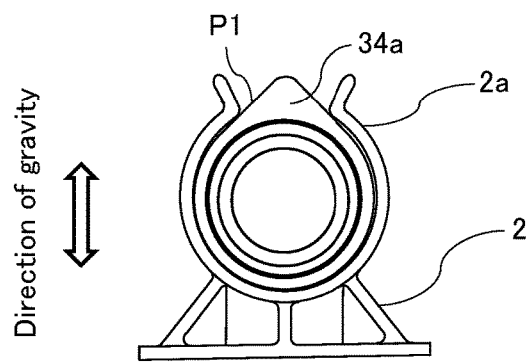
FIG. 6 is a diagram showing an example of fixing the liquid fuel piping P1 of the first embodiment.

FIGS. 5 and 6 are diagrams to be used for describing a first embodiment. FIG. 5 is a diagram showing a sectional shape of the liquid fuel piping P1 according to the first embodiment, and FIG. 6 is a diagram showing a state in which the liquid fuel piping P1 is mounted into the clamp 2.

The liquid fuel piping P1 of the present embodiment is characterized to have a structure in which the third layer 34 partially having different wall thicknesses in the circumferential direction is arranged on an outer side in a radial direction of the first layer 31, which serves as a barrier layer and has a uniform wall thickness, and to be mounted at the time of assembly so that a portion of the third layer 34 having different wall thicknesses sits vertically at an end.

The present embodiment allows the first layer 31 as a barrier layer to have a uniform wall thickness, to achieve increasing the strength of the liquid fuel piping P1 without increasing usage of expensive material as described above.

Specifically, a wall thickness of a portion (34a) of the third layer 34 of the liquid fuel piping P1 is made to be larger than that of any other portions, as shown in FIG. 5, so that the portion having the largest wall thickness corresponds to an opening of the clamp 2 when the liquid fuel piping P1 is mounted to the clamp 2. Accordingly, the thick-wall portion 34a stops the liquid fuel piping P1 from being turned, as shown in FIG. 6.

Although not shown, the thick-wall portion 34a may have a shape different from that shown in FIG. 5, in which the thick-wall portion 34a has a substantially constant wall thickness across the opening of the clamp 2 to form a shape having the thick-wall portion 34a stepped above other portions of the third layer 34.

In addition, the liquid fuel piping P1 is mounted into the clamp 2 so that the thick-wall portion 34a of the liquid fuel piping P1 sits vertically at an end. For example, in a case where the liquid fuel piping P1 is routed under a lower surface of the floor panel 11, the clamp 2 is installed on the lower surface of the floor panel 11 so that the opening of the clamp 2 faces downward, and then the liquid fuel piping P1 is mounted into the clamp 2. That is, the thick-wall portion 34a of the liquid fuel piping P1 is mounted so as to face a road surface (the upper side in FIG. 6 turns to face a road surface).

In this state, flexural rigidity in the direction of gravity of the liquid fuel piping P1 is large, and then the sagging amount of the liquid fuel piping P1 between the clamps 2 is less, as compared with the case where the liquid fuel piping P1 has a uniform wall thickness.

Additionally, the thick-wall portion 34a stops the liquid fuel piping P1 from being turned so as to allow the liquid fuel piping P1 to maintain the constant sagging.

Accordingly, the liquid fuel piping P1 is suppressed from being vibrated to prevent fuel leakage due to cracking of the liquid fuel piping P1. Further, there is no need to increase the number of clamps 2, and then working efficiency is not reduced.

Moreover, in the present embodiment, the liquid fuel piping P1 is suppressed by the thick-wall portion 34a of the liquid fuel piping P1 and the holding portion 2a of the clamp 2 from being turned. That is, the suppression is not due to a frictional force between the liquid fuel piping P1 and the clamp 2. Therefore, the holding portion 2a of the clamp 2 may have any shape which allows the clamp 2 to elastically hold the liquid fuel piping P1 to such a degree that the liquid fuel piping P1 does not come off out of the C-shaped opening of the clamp 2, which remains partially open when in position to hold the fuel piping. According to the present embodiment, the holding portion 2a may hold the liquid fuel piping P1 by a force smaller than that required for fixing the liquid fuel piping P1 by the frictional force, and this allows the clamp 2 to have a smaller elastic opening force, requiring a smaller force for mounting the liquid fuel piping P1 to facilitate mounting the liquid fuel piping P1 .

Here, the third layer 34 of the liquid fuel piping P1 in FIG. 5 may be molded by a die shape of the extrusion for producing the liquid fuel piping P1. The liquid fuel piping P1 of subsequent embodiments may similarly be produced.

Second Embodiment

Figure 11:
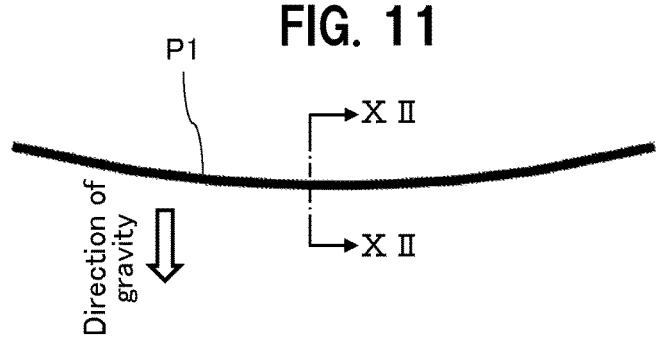
FIG. 11 is a diagram showing the position of a thick-wall portion of liquid fuel piping P1 of a second embodiment.
Figure 12:
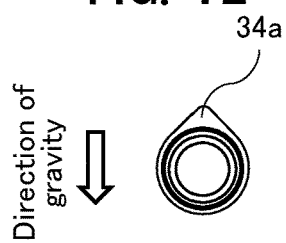
FIG. 12 is a sectional view taken along a line XII-XII in FIG. 11.

In the embodiment described above, only one thick-wall portion 34a is formed in a cross section in the circumferential direction, and additionally an example has been shown in which the thick-wall portion 34a is mounted to face toward the road surface. However, the thick-wall portion 34a may be positioned so as to face the lower surface of the floor panel 11. That is, as shown in FIG. 11 and FIG. 12, which shows a cross-section taken along a line XII-XII in FIG. 11, the thick-wall portion 34a may be arranged on a compression side (opposite side of the direction of gravity) of the sagging liquid fuel piping P1 by gravity.

In this case, flexural rigidity in the direction of gravity of the liquid fuel piping P1 increases, and extending amount by swelling in the tube-length direction of the third layer 34 of the liquid fuel piping P1 is larger at the thick-wall portion 34a than that at any other portions in the circumferential direction, to act so as to extend the compression side of the sagging liquid fuel piping P1. In other words, extension by swelling reacts on a compressive force by gravity, to reduce sagging of the liquid fuel piping P1.

Third Embodiment

Next, a description will be given of an embodiment of the liquid fuel piping P1 having another shape, with reference to FIGS. 7 and 8. In the present embodiment, the liquid fuel piping P1 has an elliptical or oval outer shape, to reduce sagging of the liquid fuel piping P1 and stop the liquid fuel piping P1 from being turned.

Figure 7:
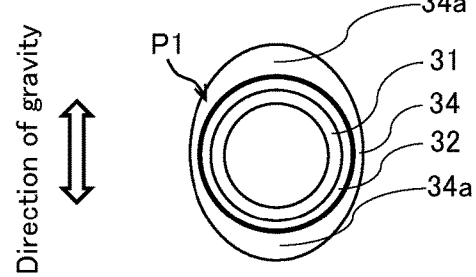
FIG. 7 is a diagram showing a cross-sectional structure of liquid fuel piping P1 of a third embodiment.

FIG. 7 shows an example in which the liquid fuel piping P1 has an elliptical cross section. In particular, the third layer 34 on an outer side of the first layer 31, which serves as a barrier layer and has a uniform thickness, has an elliptical outer shape. In this case, the liquid fuel piping P1 is routed on the lower surface of the floor panel 11 so that the long axis of the elliptical shape is aligned in the direction of gravity. The same is true in a case where the liquid fuel piping P1 has an oval cross section.

With the liquid fuel piping P1 having an elliptical or oval outer shape, the flexural rigidity in the direction of gravity increases. The liquid fuel piping P1 now has thick walls on both of the compression side and the tension side of the sagging liquid fuel piping P1 between the clamps 2, to significantly improve rigidity as compared to the liquid fuel piping P1 having the shape of the first embodiment. As a result, the sagging of the liquid fuel piping P1 between the clamps 2 is smaller than that in the first embodiment or in the case where the liquid fuel piping P1 has a uniform wall thickness.

Figure 8:
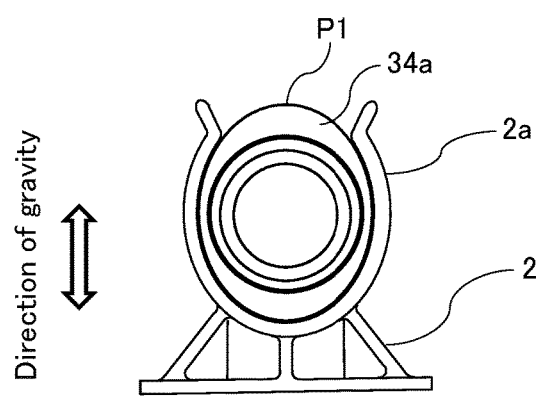
FIG. 8 is a diagram showing an example of fixing the liquid fuel piping P1 of the third embodiment.

FIG. 8 shows a relationship between the liquid fuel piping P1 in FIG. 7 and the clamp 2 for fixing the pipe. The holding portion 2a of the clamp 2 holds the liquid fuel piping P1 as if to pinch the long axis. For this purpose, the holding portion 2a of the clamp 2 has a contact surface having the same shape as the outer shape of the liquid fuel piping P1, to elastically pinch and hold the liquid fuel piping P1 in the short axis direction by an elastic force of the holding portion 2a. The liquid fuel piping P1 is fixed by the holding portion 2a of the clamp 2 in a state of being pinched so as to suppress the liquid fuel piping P1 from being turned.

Thus, the liquid fuel piping P1 is mounted without sagging to suppress the liquid fuel piping P1 from being vibrated for preventing fuel leakage due to cracking of the liquid fuel piping P1.

As shown in FIGS. 1 and 2, the liquid fuel piping P1 is mounted between the fuel tank T and its surroundings and the engine E so as to orient various directions, to have the direction of gravity of the liquid fuel piping P1 changed. The liquid fuel piping P1 of the present embodiment has two portions having an uneven thickness, and then has less torsion of the pipe as compared with the first embodiment to facilitate routing the liquid fuel piping P1.

Fourth Embodiment

Figure 9:
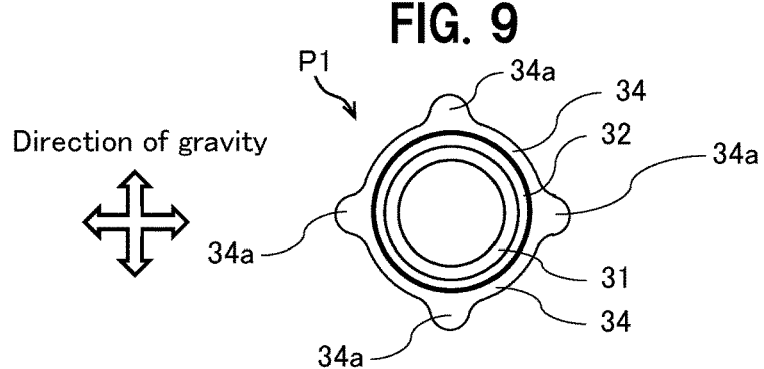
FIG. 9 is a diagram showing a cross-sectional structure of liquid fuel piping P1 of a fourth embodiment.
Figure 10:
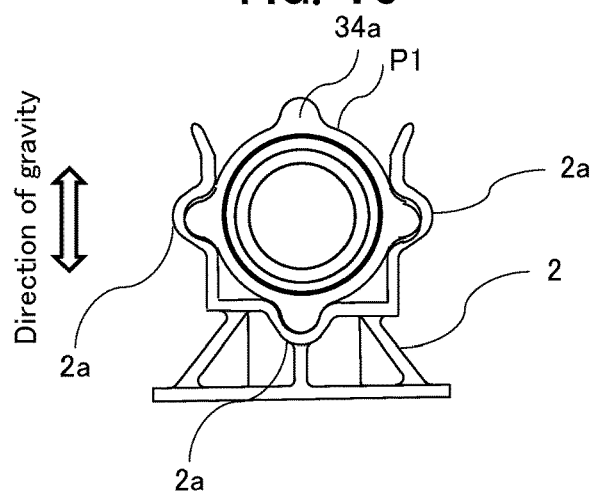
FIG. 10 is a diagram showing an example of fixing the liquid fuel piping P1 of the fourth embodiment.

Next, a description will be given of an example in which an outer shape of the liquid fuel piping P1 has an uneven thickness in four directions. FIG. 9 is a diagram showing a cross section of the liquid fuel piping P1 of the present embodiment. FIG. 10 is a diagram showing a cross section of the clamp 2 and the liquid fuel piping P1 of the present embodiment in an assembled state.

The present embodiment is intended to stop the liquid fuel piping P1 from being turned and reduce sagging thereof, as with other embodiments, but is characterized in that the liquid fuel piping P1 can be routed more easily and has less twisting, as compared with those in other embodiments.

As shown in FIG. 9, the third layer 34 on the outer side of the first layer 31, which is a barrier layer and has a uniform wall thickness, of the liquid fuel piping P1 according to the present embodiment has four thick-wall portions 34a at intervals in the circumferential direction. Then, as shown in FIG. 10, the liquid fuel piping P1 is mounted to the clamp 2 at three points: two thick-wall portions 34a which are positioned at opposite positions in the circumferential direction, and another thick-wall portion 34a. As a result, the liquid fuel piping P1 is stopped from being turned.

Note that the present invention is not limited to the liquid fuel piping P1 having four thick-wall portions 34a of the present embodiment as shown in FIG. 9, and the liquid fuel piping P1 may have four or more even number of thick-wall portions 34a.

Then, mounting the liquid fuel piping P1 such that the thick-wall portions 34a at the opposite positions in the circumferential direction are aligned in the direction of gravity allows the liquid fuel piping P1 to have larger flexural rigidity in the direction of gravity and to have less sagging between the clamps 2, as compared to a case where the liquid fuel piping P1 has a uniform wall thickness. Accordingly, vibration of the liquid fuel piping P1 is suppressed to prevent fuel leakage due to cracking of the liquid fuel piping P1. In addition, there is no need to increase the number of clamps 2, and then working efficiency is not reduced.

FIG. 10 shows the liquid fuel piping P1 in FIG. 9 and the clamp 2 for fixing the same. The respective holding portions 2a of the clamp 2 according to the present embodiment have contact surfaces inwardly having the same shape as the outer shapes of the thick-wall portions 34a of the liquid fuel piping P1 to hold the thick-wall portions 34a of the liquid fuel piping P1. Thus, the liquid fuel piping P1 is inhibited from being turned.

The holding portions 2a of the clamp 2, which hold the thick-wall portions 34a positioned at opposite positions in the circumferential direction of the liquid fuel piping P1, elastically pinch and hold the liquid fuel piping P1 for fixing the same by an elastic force between the holding portions 2a.

The liquid fuel piping P1 of the present embodiment has four thick-wall portions 34a arranged in the circumferential direction, to allow for changing orientation of the piping at a unit of 90 degrees while being mounted so that the thick-wall portions 34a are aligned in the direction of gravity. This allows the liquid fuel piping P1 to be easily routed without being twisted, as compared to other embodiments.

The present invention is not limited to the embodiments described above, and includes various modifications. The embodiments have been described in detail in order to better illustrate the present invention, which is not necessarily limited to include all the configurations as described above. In addition, part of the configuration of a certain embodiment may be replaced with the configuration of another embodiment, and/or the configuration of a certain embodiment may be added with that of another embodiment.

The invention claimed is:

1. Fuel piping for a vehicle, to be fixed by clamps and routed on a vehicle body, said fuel piping comprising:
two or more resin layers, at least one of which has low permeability for liquid fuel, wherein an outermost resin layer has, in a cross-sectional view, anisotropy in a wall-thickness-in a circumferential direction, while other resin layers have cross-sectional shapes of hollow cylinders; and
wherein the outermost resin layer forms a wall whose thickness continuously varies and which has at least one thick-wall portion in the circumferential direction,
wherein the fuel piping is configured to be disposed on a vehicle body so that the thick-wall portion is positioned vertically at the top or bottom to suppress sagging of the fuel piping.

2. The fuel piping for a vehicle according to claim 1, comprising:
one thick-wall portion in the circumferential direction,
wherein the fuel piping for a vehicle is disposed on the vehicle body so that the thick-wall portion is positioned vertically at the top.

3. A clamp for fuel piping for a vehicle, used for fixing to the vehicle the fuel piping for a vehicle according to claim 1, said clamp comprising:
a holding portion that arranges the at least one thick-wall portion of the fuel piping for a vehicle vertically at an end, and elastically pinches and holds the fuel piping so as not to be turned in the circumferential direction thereof, and the holding portion is partially open when in position to hold the fuel piping.

4. The fuel piping for a vehicle according to claim 1, wherein
the thick wall portion of the fuel piping for a vehicle has an elliptical or oval outer shape, and is arranged on the vehicle body using clamps so that the long axis in a cross section is aligned in the vertical direction.

5. A clamp for fuel piping for a vehicle, used for fixing the fuel piping for a vehicle according to claim 4, wherein
a holding portion of the clamp for fixing the fuel piping elastically pinches and holds the fuel piping in the short axis direction, and the holding portion is partially open when in position to hold the fuel piping.

6. A clamp for the fuel piping for a vehicle according to claim 1, wherein an outer shape of the fuel piping corresponds to a shape of a portion of the clamp for holding the fuel piping.

7. A clamp for fuel piping for a vehicle, used for fixing to the vehicle the fuel piping for a vehicle according to claim 2, comprising:
a holding portion that arranges the thick-wall portion of the fuel piping for a vehicle vertically at an end, and elastically pinches and holds the fuel piping so as not to be turned in the circumferential direction thereof, and the holding portion is partially open when in position to hold the fuel piping.

8. The fuel piping for a vehicle according to claim 2, wherein
the thick wall portion of the fuel piping for a vehicle has an elliptical or oval outer shape, and is arranged on the vehicle body using clamps so that the long axis in a cross section is aligned in the vertical direction.

9. A clamp for fuel piping for a vehicle, used for fixing the fuel piping for a vehicle according to claim 8, wherein
a holding portion of the clamp for fixing the fuel piping elastically pinches and holds the fuel piping in the short axis direction, and the holding portion is partially open when in position to hold the fuel piping.

10. A clamp for the fuel piping for a vehicle according to claim 2, wherein an outer shape of the fuel piping corresponds to a shape of a portion of the clamp for holding the fuel piping.

11. The fuel piping for a vehicle according to claim 1, wherein a thickness of a top portion of the thick wall portion and a thickness of a bottom portion of the thick wall portion of the fuel piping are substantially equal to each other.

12. The fuel piping for a vehicle according to claim 1, wherein the outermost resin layer forming a wall includes two or more thick-wall portions in the circumferential direction, the thick-wall portions having uneven thickness larger than that of any other portion of the wall, and
wherein the fuel piping is disposed on the vehicle body so that the thick-wall portions provide outer shapes corresponding to inwardly shaped piping contact surfaces of a clamp, to inhibit turning of the fuel piping.

13. A clamp for fuel piping for a vehicle according to claim 12, said clamp comprising
a holding portion for receiving the fuel piping having inner contact surfaces for contacting the fuel piping outer shapes, the contact surfaces being inwardly shaped to correspond to the outer shapes of the thick wall portions of the fuel piping, to inhibit turning of the fuel piping, and wherein the holding portion elastically pinches and holds the fuel piping in position, and the clamp is partially open when in position to hold the fuel piping.

14. Fuel piping for a vehicle, to be fixed by clamps and routed on a vehicle body, said fuel piping comprising:

two or more resin layers, at least one of which has low permeability for liquid fuel, wherein an outermost resin layer has, in a cross-sectional view, anisotropy in a wall-thickness in a circumferential direction, while other resin layers have cross-sectional shapes of hollow cylinders; and wherein the outermost resin layer forms a wall whose thickness continuously varies and which has at least one thick-wall portion in the circumferential direction, and further including a clamp for fixing the fuel piping to the vehicle, said clamp including a holding portion which elastically pinches and holds the fuel piping, and positions the thick-wall portion for stopping the fuel piping from being turned in a circumferential direction, and the holding portion is partially open when in position to hold the fuel piping.

15. The fuel piping according to claim 13, wherein the fuel piping thick wall portions have outer shapes corresponding to inwardly shaped piping contact surfaces of the holding portion of the clamp, which together inhibit turning of the fuel piping.

* * * * *